No. 764,724. PATENTED JULY 12, 1904.
D. F. HENRY, Jr.
TILE TURNING APPARATUS.
APPLICATION FILED DEC. 30, 1903.
NO MODEL. 3 SHEETS—SHEET 1.

Witnesses
Lindsay deB. Little
Joseph J. Furner

Inventor
D. F. Henry Jr.
By Jno. Horbit
Atty.

No. 764,724. PATENTED JULY 12, 1904.
D. F. HENRY, Jr.
TILE TURNING APPARATUS.
APPLICATION FILED DEC. 30, 1903.
NO MODEL. 3 SHEETS—SHEET 3.

Witnesses
Inventor

No. 764,724. Patented July 12, 1904.

UNITED STATES PATENT OFFICE.

DAVID FORD HENRY, JR., OF PORT MURRY, NEW JERSEY.

TILE-TURNING APPARATUS.

SPECIFICATION forming part of Letters Patent No. 764,724, dated July 12, 1904.

Application filed December 30, 1903. Serial No. 187,178. (No model.)

*To all whom it may concern:*

Be it known that I, DAVID FORD HENRY, Jr., a citizen of the United States, residing at Port Murry, in the county of Warren and State of New Jersey, have invented certain new and useful Improvements in Tile-Turning Apparatus, of which the following is a specification, reference being had therein to the accompanying drawings.

In the manufacture of fireproofing and other hollow tile the molded form usually emerges from the die in a continuous horizontal stream and is then cut into commercial lengths. In drying the tile preparatory to burning it is desirable to have the same stand on end or with their cells disposed vertically in order that the air may pass more readily therethrough, and to accomplish this it is necessary to turn each section or tile from horizontal to vertical position. When done by hand, this work is laborious and tedious, especially as the green or freshly-formed tile are soft and easily distorted or broken.

One object of the present invention is to provide turning apparatus which shall be operative at the end of the cutting or delivery table of the tile-forming machine and adapted to receive the tile therefrom in horizontal position and turn them to vertical position.

A further object is to so construct the apparatus that the same is operative in connection with portable palettes upon which the tile are deposited when inverted.

A still further object is to provide means for automatically removing the tile-laden palettes from the turning mechanism, and the arrangement is preferably such that the palettes thus removed are positioned in the path of conveying apparatus by which they are carried forward wherever desired.

While my improved apparatus is designed more especially for properly arranging and delivering tile to my improved drier, shown and described in Letters Patent granted me February 9, 1904, No. 751,852, it may be employed in other connections, as will be understood.

Figure 1:
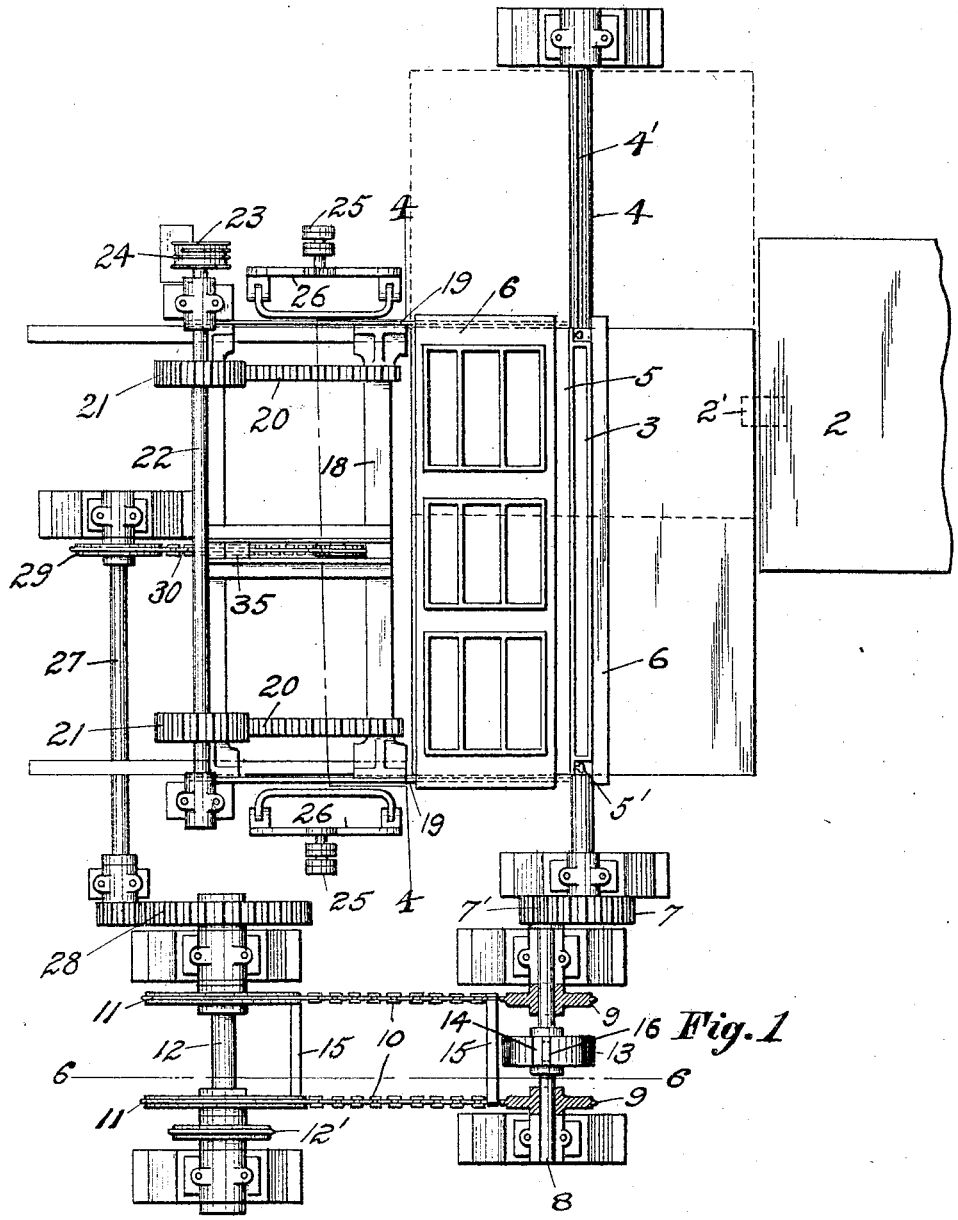
Figure 6:
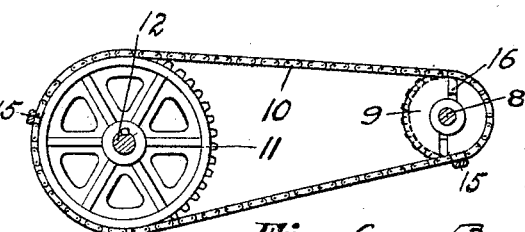
Figure 2:
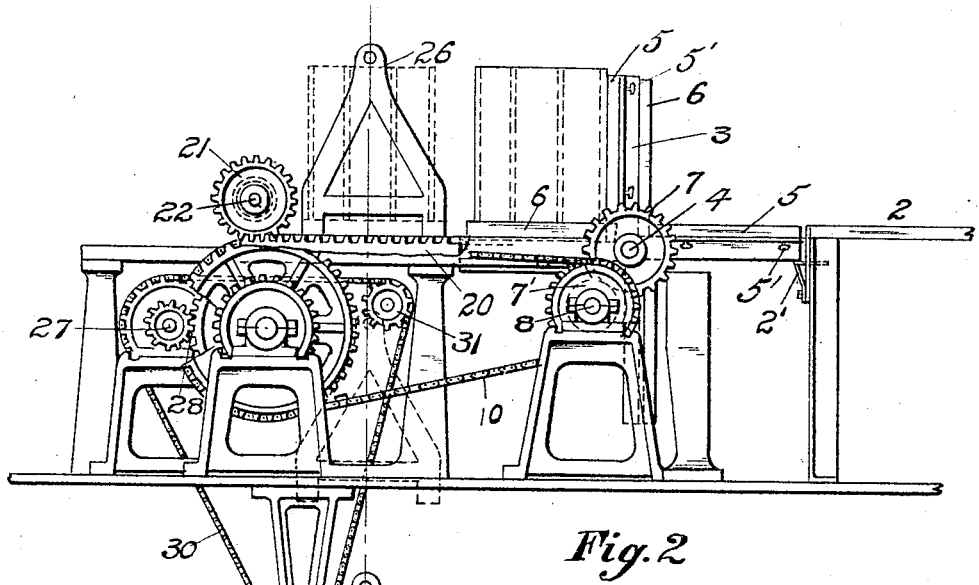
Figure 3:
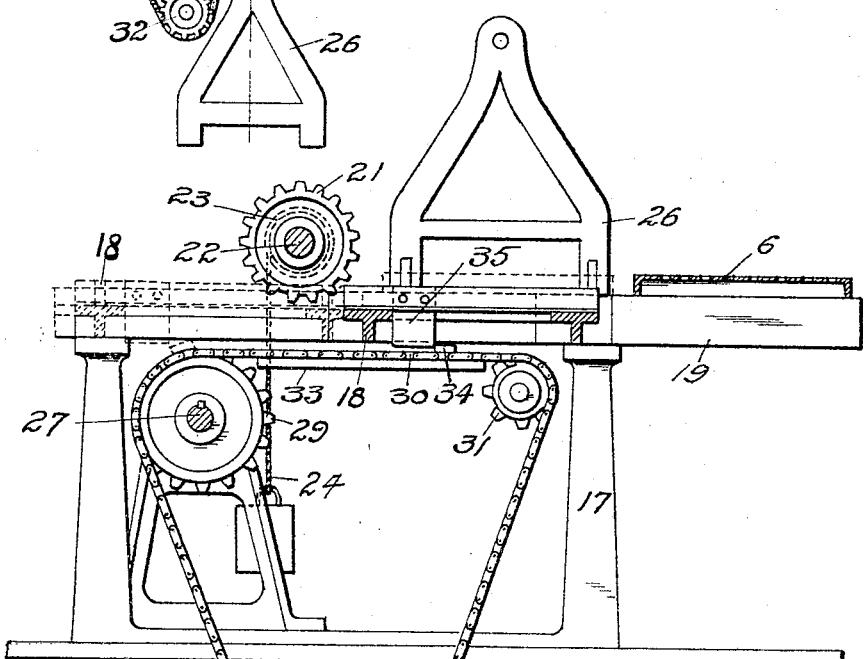
Figure 4:
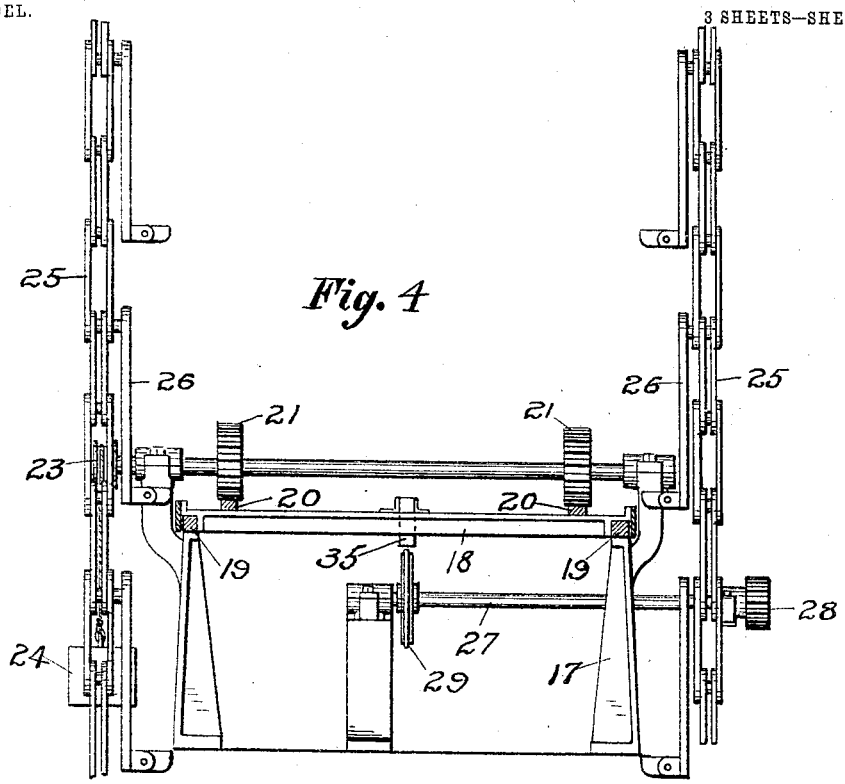
Figure 5:
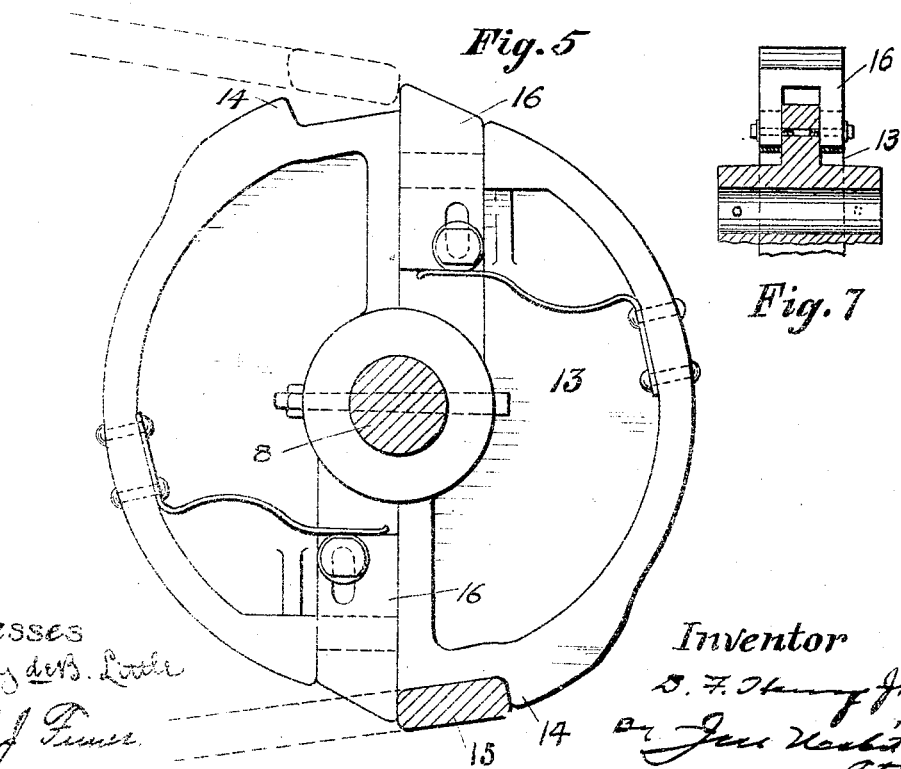
Figure 7:
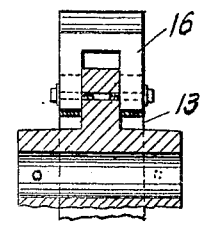

In the accompanying drawings, Figure 1 is a plan view of my improved apparatus, and Fig. 2 is a side elevation of the same. Fig. 3 is a vertical sectional view of the palette-shifting mechanism. Fig. 4 is a vertical cross-sectional view on line 4 4 of Fig. 1. Fig. 5 is an enlarged detail view of the head or wheel for transmitting intermittent movement to the tile-turning mechanism. Fig. 6 is a detail view of a portion of the gearing, taken on line 6 6 of Fig. 1. Fig. 7 is a detail view.

Referring to the drawings, 2 designates the delivery-table of the tile-forming machine, (not shown,) and operative at the end thereof is the tile-turning mechanism, which consists of a frame 3 of paddle-wheel form axially mounted on shaft 4 and in the present embodiment carrying the four radially-arranged tile-receiving boards 5, which are removably secured to frame 3 by screws 5'. Boards 5 are turned successively into the plane of table 2, being sustained therein by spring 2' at the under part of table 2, which the boards freely pass in moving to position. Frame 3 has feather connection 4' with shaft 4 and is slidable by hand thereon transverse the end of table 2 to receive the tile in regular order without lifting or carrying the same. The arrangement is preferably such that three tile are turned at one time, though obviously the number may be varied.

6 is a palette which is removably positioned by hand at the rear of each board 5 and at right angles thereto, being supported by the then uppermost portion of frame 3 and against which the tile are projected as they are moved onto board 5, so that when turned the tile stand on end on the palette, and the latter is then removed from the turning mechanism in manner presently to be explained. It is desirable to approximately center the tile on the palette, so that the latter may be carried by the conveying mechanism without tilting, and to accomplish this with tile of different size the thickness of removable boards 5 may be so varied that the tile will be sustained in position to be properly centered on the palette when turned.

At each operation shaft 4 makes a quarter-revolution, and to accomplish this intermittent movement a gear 7 is secured to one end of the shaft and meshes with pinion 7' on shaft 8, and loosely mounted on the latter are two sprocket-wheels 9, which are driven by chains 10 from sprockets 11 on shaft 12, the latter receiving power through sprocket 12' from any suitable source. Secured to shaft 8 between the loose sprockets 9 is the drum-like head 13, having its periphery enlarged at opposite sides to form shoulders 14, which are in the plane of the peripheries of sprockets 9, and hence adapted to take position in the path of slats 15, which connect and are carried by chains 10. The arrangement is such that at the proper moment the under traveling slat 15 engages shoulder 14 then at the under side of head 13, and in doing so it passes over and is confined in said engagement by spring-latch 16. Shaft 8 is thus caused to turn with the chains until head 13 has turned through a half-revolution, when slat 15 is released from its engagement therewith by the pitch of the chain, as will be understood by referring to Fig. 5. Shaft 8 in making this half-revolution turns shaft 4 and frame 3 a quarter of a revolution, a distance sufficient to turn the tile and properly position them on the palette and with the latter at the side of frame 3 opposite table 2 and ready to be moved from frame 3, as shown in full lines in Figs. 1 and 2, and at the completion of said movement the other shoulder, 14, is in undermost position ready for the next operation. Latch 16 provides for a positive connection between the driving and driven elements and avoids an accelerated movement during the latter part of the operation which otherwise would be occasioned by the weight of the tile being turned.

Adjacent the delivery side of turning frame 3 is the stationary support 17, and slidable on the upper side thereof is transfer-table 18, from which project the two arms 19, and with these arms extended frame 3 is adapted to turn therebetween and deposit thereon the tile-laden palette, the latter being longer than frame 3, so that its ends project sufficiently to rest on said arms. On the upper side of table 18 are racks 20, and meshing therewith are pinions 21 on cross-shaft 22. Also carried by this shaft is sheave 23, upon which winds the weighted line 24 when table 18 is retracted with the loaded palette, and when thus retracted the palette is positioned between the two vertically-moving conveyer-chains 25, to which are pivotally secured the opposite lifts 26, which move upward under the projecting ends of the palette and carry the same upward to drying apparatus (not shown) or wherever desired. The construction of the chains and lifts is fully shown and described in my patent above referred to. When thus freed of its load, the table 18 is again extended by the unwinding action of weighted line 24, with arms 19 projected and ready to receive the next palette.

To automatically retract the palette-laden table, a shaft 27 is geared at 28 to drive-shaft 12 and carries sprocket 29, upon which operates sprocket-chain 30, the chain also passing around idler-sprockets 31 and 32. The chain travels through or over a horizontal guide 33 immediately beneath table 18, and fixed to the chain is knocker 34, which is adapted to engage lug 35 on the under side of table 18, and by this means the table is retracted to position between the conveyer-chains, where it is held against the pull of weighted line 24 by the weight of the tile. Lifts 26 are arranged at regular intervals on chains 25, and the operations of the tile-turning and palette-shifting mechanisms are so timed as to deliver a loaded palette to each pair of lifts. As the greater part of the time is required to position the tile on the turning mechanism the latter must turn quickly, and the same is true of the palette-positioning table 18. With the mechanism herein shown and described these operations are accomplished regularly and with precision, the whole being entirely automatic, save the placing of the tile on the turning device.

While I have shown and described the preferred embodiment of the several improvements, various changes and modifications may be resorted to without departing from the spirit of the invention as defined by the appended claims.

I claim—

1. The combination of tile-turning mechanism, a palette carried thereby independently of the tile and adapted to support the tile when turned, and a laterally-movable palette-receiving support distinct from the turning mechanism and adapted to remove the palette therefrom.

2. The combination of tile-turning mechanism, a palette carried thereby independently of the tile and adapted to support the tile when turned, a movable support adapted to receive the tile-laden palette, and means for retracting the support and for returning the same to palette-receiving position.

3. The combination of rotatable tile-turning mechanism, a palette carried thereby and adapted to support the tile when turned, a movable palette-receiving support having position normally in the path of the turning mechanism, means for retracting the support, and means for returning the same to palette-receiving position.

4. The combination of tile-turning mechanism, a palette carried thereby and adapted to support the tile when turned, a movable palette-receiving support having position normally in the path of the turning mechanism, means for retracting the palette-laden support, and means for automatically returning the support to receiving position when relieved of its load.

5. The combination of a sliding ware-support, means for holding the same normally projected or in ware-receiving position, and an endless chain adapted to operatively engage the support for retracting the same.

6. The combination of tile-turning mechanism, a palette adapted to support the tile when turned, a movable support adapted to receive the tile-laden palette and remove the same from the turning mechanism, and means for automatically returning the support to palette-receiving position when relieved of its load.

7. The combination of the sliding palette-support, means for retracting the support, a weighted line operatively connected to the support and constructed and arranged to be raised when the support is retracted and operating to return the support from retracted position.

8. The combination of tile-turning mechanism adapted to turn on a horizontal axis, a palette adapted to be carried thereby and support the tile when turned, and a movable palette-support having arms projecting into the path of the turning mechanism for receiving the tile-laden palette.

9. The combination of tile-turning mechanism adapted to turn on a horizontal axis, a palette longer than the turning mechanism and adapted to be carried thereby and support the tile when turned, and a movable palette-support having projecting arms between which said mechanism is adapted to turn and upon which the projecting ends of the palettes are adapted to rest.

10. The combination of tile-turning mechanism rotatable on a horizontal axis and having a tile-receiving surface movable longitudinally of said axis, a tile-delivering table at one side of said mechanism, and tile-receiving means at the opposite side thereof.

11. The combination of tile-turning mechanism rotatable on a horizontal axis, a tile-delivering table at one side of said mechanism, and tile-receiving means at the opposite side thereof.

12. The combination of tile-turning mechanism rotatable and slidable longitudinally on a horizontal axis, a tile-delivering table at one side of said mechanism, and tile-receiving means at the opposite side thereof.

13. The combination of tile-turning mechanism, and laterally-movable tile-receiving means constructed and arranged to automatically receive and remove the tile from the turning mechanism.

14. Tile-turning mechanism adapted to turn in a vertical arc and having a movable tile-sustaining surface, and means adjacent said surface for removably sustaining a palette at right angles thereto.

15. The combination of tile-turning mechanism, movable tile-receiving means constructed and arranged to automatically receive and remove the tile from the turning mechanism, and actuating mechanism for causing the turning mechanism and tile-receiving means to operate intermittently and alternately.

16. The combination of tile-turning mechanism adapted to rotate on a horizontal axis, tile-receiving means movable laterally with relation to the turning mechanism and constructed and arranged to automatically receive and remove the tile therefrom, and actuating mechanism for causing the turning mechanism and tile-receiving means to operate intermittently and alternately.

17. The combination of tile-turning mechanism, constantly-moving actuating means, and projections on the latter adapted to automatically engage and disengage the turning mechanism for intermittently operating the same.

18. The combination of tile-turning mechanism, endless actuating means adapted to move around the axis of said turning mechanism, and devices at intervals on the endless actuating means for engaging the turning mechanism and imparting thereto intermittent partial rotation.

19. The combination of intermittently-operating tile-turning mechanism, an actuating-shaft therefor, a head projecting from the shaft, two drive-chains operative at opposite sides of the head, and slats secured to the chains adapted to engage and intermittently turn said head and shaft.

20. The combination of intermittently-operating tile-turning mechanism, an actuating-shaft therefor, a head carried by the shaft having radial projections, two parallel drive-chains operative on opposite sides of the head, slats secured to the chains adapted to intermittently engage the head projections and turn said shaft, and spring-latches operative in the head for holding the slats in engagement with said projections.

In testimony whereof I affix my signature in presence of two witnesses.

DAVID FORD HENRY, Jr.

Witnesses:
MARGARET HUGHES,
J. M. NESBIT.